(12) United States Patent
Williams et al.

(10) Patent No.: US 9,802,656 B1
(45) Date of Patent: Oct. 31, 2017

(54) VEHICLE SENSING SYSTEMS INCLUDING RETRACTABLE MOUNTING STRUCTURES

(71) Applicant: Toyota Motor Engineering & Manufacturing North America, Inc., Erlanger, KY (US)

(72) Inventors: Paxton S. Williams, Milan, MI (US); Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/175,548

(22) Filed: Jun. 7, 2016

(51) Int. Cl.
| | | |
|---|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2006.01) |
| *B62D 35/00* | (2006.01) |
| *G01S 7/02* | (2006.01) |
| *G01S 7/48* | (2006.01) |
| *G01S 13/89* | (2006.01) |
| *G01S 17/89* | (2006.01) |

(52) U.S. Cl.
CPC ............. *B62D 35/00* (2013.01); *G01S 7/02* (2013.01); *G01S 7/48* (2013.01); *G01S 13/89* (2013.01); *G01S 17/89* (2013.01)

(58) Field of Classification Search
CPC ... B62D 35/00; G01S 7/02; G01S 7/48; G01S 13/89; G01S 17/89
USPC ............................................................ 701/49
See application file for complete search history.

(56) References Cited

U.S. PATENT DOCUMENTS

| | | | |
|---|---|---|---|
| 7,125,070 B2* | 10/2006 | Sawada | B60J 7/0435 |
| | | | 296/216.03 |
| 8,616,623 B2 | 12/2013 | Sawada | |
| 8,818,609 B1* | 8/2014 | Boyko | B60W 30/00 |
| | | | 342/70 |
| 9,097,800 B1* | 8/2015 | Zhu | G01S 13/865 |

(Continued)

FOREIGN PATENT DOCUMENTS

| | | |
|---|---|---|
| CN | 204845439 U | 12/2015 |
| DE | 102011075407 B4 | 2/2013 |

(Continued)

*Primary Examiner* — Harry Oh
(74) *Attorney, Agent, or Firm* — Dinsmore & Shohl LLP (57) ABSTRACT

A vehicular sensing system, a vehicle and a method of performing one or both of vehicular mapping and navigating operations using the sensing system. The sensing system includes one or more sensors, a retractable mounting structure secured to a roof of the vehicle to be selectively placed within a recess formed in the roof. The mounting structure and sensor cooperative with one another such that the mounting structure selectively moves the sensor between a stowed position and a deployed position. A fairing is used to cover at least a portion of the sensing system and the recess when the sensing system is stowed within the recess. In a deployed position, the sensor is extended away from the roof to permit the sensor to acquire mapping or navigation data, while in its stowed position, the sensor, mounting structure and fairing define aesthetically-pleasing and aerodynamically unobtrusive profile across the portion of the roof that corresponds to the recess.

20 Claims, 6 Drawing Sheets

(56) References Cited

U.S. PATENT DOCUMENTS

| | | | |
|---|---|---|---|
| 9,234,618 B1* | 1/2016 | Zhu | G01S 17/10 |
| 9,395,727 B1* | 7/2016 | Smith | G05D 1/0257 |
| 2009/0138138 A1* | 5/2009 | Ferren | G01C 23/00 |
| | | | 701/3 |
| 2013/0325182 A1* | 12/2013 | Setrakian | B25J 9/161 |
| | | | 700/264 |
| 2014/0018995 A1* | 1/2014 | Ferguson | G06K 9/00798 |
| | | | 701/25 |
| 2014/0267703 A1* | 9/2014 | Taylor | G06T 7/73 |
| | | | 348/139 |

FOREIGN PATENT DOCUMENTS

| | | |
|---|---|---|
| KR | 100527124 B1 | 11/2005 |
| KR | 101054637 B1 | 7/2011 |

* cited by examiner

VEHICLE SENSING SYSTEMS INCLUDING RETRACTABLE MOUNTING STRUCTURES

TECHNICAL FIELD

The present specification generally relates to the use of sensors for vehicular mapping and navigation, more specifically, to roof-mounted vehicle sensing systems with retractable mounting structures for facilitating use of such sensors.

BACKGROUND

Sensors such as lidar (light detection and ranging user laser light) can be used by vehicles to provide detailed 3D spatial information for the identification of objects near the vehicle, as well as the use of such information in the service of systems for vehicular mapping, navigation and autonomous operations. In order to be effective, these devices (which tend to be somewhat bulky) must be placed on locations on the vehicle that promote a wide and relatively unencumbered range of detection or field-of-view; such locations include the roof, hood or the like. Unfortunately, such placement can be both aerodynamically and aesthetically objectionable.

Accordingly, a need exists for alternative devices and methods for promoting the acquisition of mapping and navigation data for—among other things—autonomous vehicle operation without the drawbacks of conventional sensors and sensor-actuation componentry.

SUMMARY

In one embodiment, a sensing system for use on a vehicle is disclosed. The system includes one or more sensors connected to moveable mounting structure. The system is compact enough to ensure that when it is in a stowed position within the roof that is situated on the top of the vehicle, it defines a relatively unobtrusive profile that does not substantially alter the roof profile, yet when placed in a deployed position to perform a data acquisition function commensurate with mapping or navigational operations does so with an automated, simple mechanical movement. By using small (i.e., miniaturized) sensors, the mounting structure may be made up of correspondingly small linkage structure that is sized and shaped to fit within recesses formed in the roof. Additional sealed fairings are affixed to either the sensors, the mounting structure or the roof to further promote a substantially water-tight, aesthetically-pleasing roof profile during such times as when the system is in the stowed position. In one particular form, the sensing system defines a substantially flush profile across the portion of the roof defined by the recess.

In another embodiment, a vehicle is disclosed. The vehicle includes a wheeled chassis with a passenger compartment, a motive power unit, a guidance apparatus cooperative with the wheeled chassis and motive power unit and a vehicular sensing system. The sensing system includes one or more sensors configured to acquire at least one of vehicular mapping and navigational data, as well as a retractable mounting structure secured to the vehicle roof, and a fairing to cover at least portions of the sensor, mounting structure and a recess that is formed and sized within the roof to accept the sensors and mounting structure. The mounting structure and the sensor (or sensors) cooperate with one another to permit selective movement between a stowed position and a deployed position. In this way, when the system is in its deployed position, the sensor is extended away from the roof to better enable it to perform its data-acquisition function. Likewise, when the system is in its stowed position, the sensor, the mounting structure and fairing reside at least partially within a recess in such a way that the system substantially maintains continuity and profile across the portion of the roof defined by the recess. In one particular form, the sensing system defines a substantially flush profile across the portion of the roof defined by the recess.

In yet another embodiment, a method for performing at least one of vehicular mapping and vehicular navigation is disclosed. The method includes defining a recess in the roof of the vehicle and securing a sensing system to the roof so that one or more sensors, a retractable mounting structure and fairing that make up the sensing system can be moved between a stowed position and a deployed position such that when the system is in its stowed position within the recess formed in the roof, both the sensor and the mounting structure form a substantially unobtrusive profile relative to a vehicle with no such sensing system. In one particular form, the sensing system defines a substantially flush profile across the portion of the roof defined by the recess. When in the deployed position, the sensor is extended away from the roof by the linkage-based movement of the mounting structure so that once in such position, the sensor may start acquiring one or both of mapping data and navigational data. Such data may be used in the operation of the vehicle, including autonomous modes of operation.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles that are equipped with sensing systems for selectively acquiring mapping or navigational data where a retractable mounting structure moves lidar or related sensors between stowed and deployed positions. A fairing is used to cover the sensors and mounting structure when the sensing system is placed into a stowed configuration within the vehicle roof. By integrating the structure that is used to selectively deploy the sensors into the roof of the vehicle, aerodynamic and aesthetic limitations that are associated with the use of a traditional mapping or navigational data sensing system may be overcome. As used herein, the system for selectively acquiring mapping or navigational data is referred to as a sensing system or a perception system. This system may be used to operate the vehicle at least partially in response to the acquired mapping and navigational data. More particularly, such operation of the vehicle may include autonomous vehicle operation.

Figure 1:
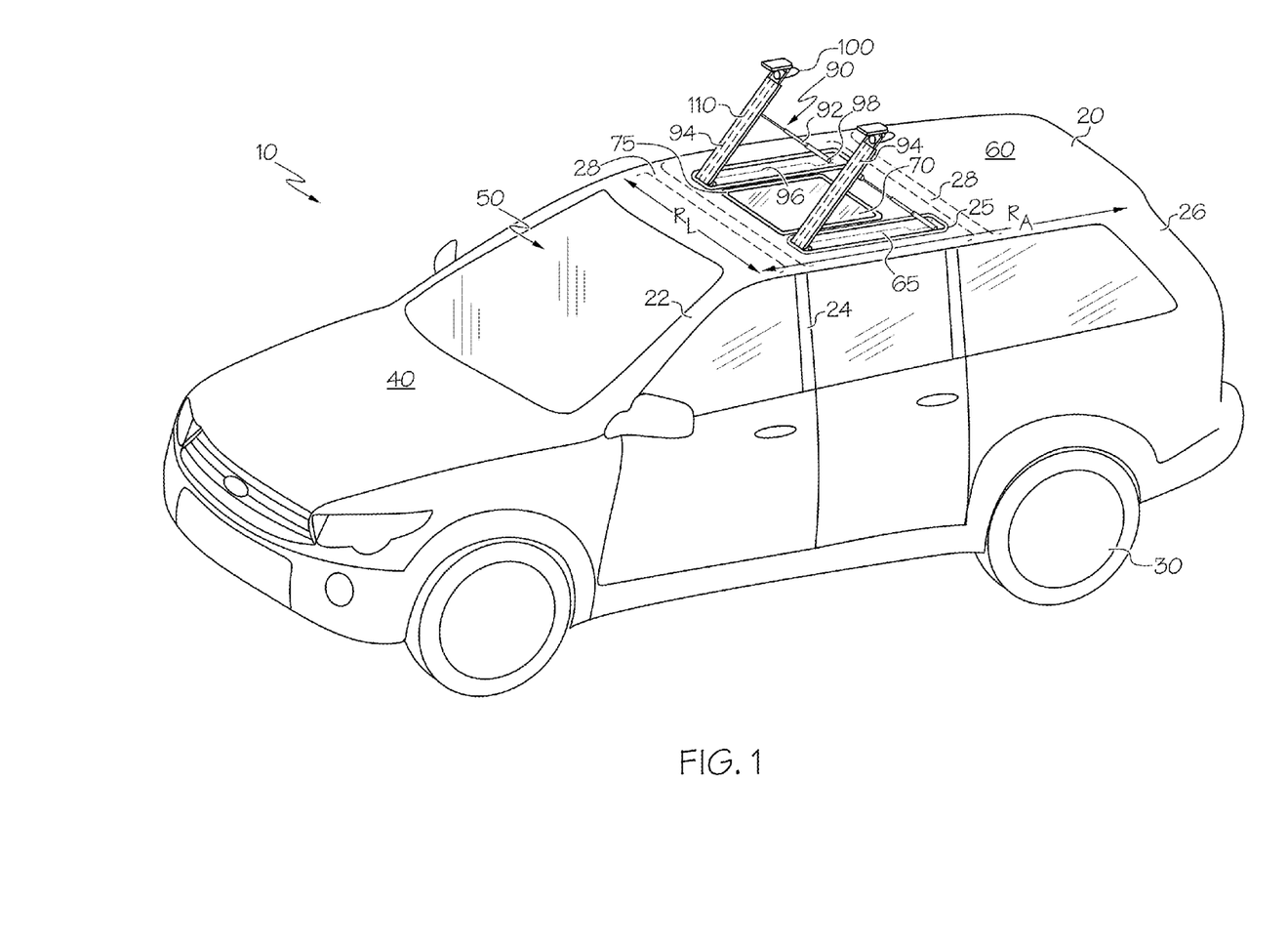
FIG. 1 depicts a perspective view of a vehicle with a sensing system in a deployed position according to one embodiment as described herein.
Figure 2:
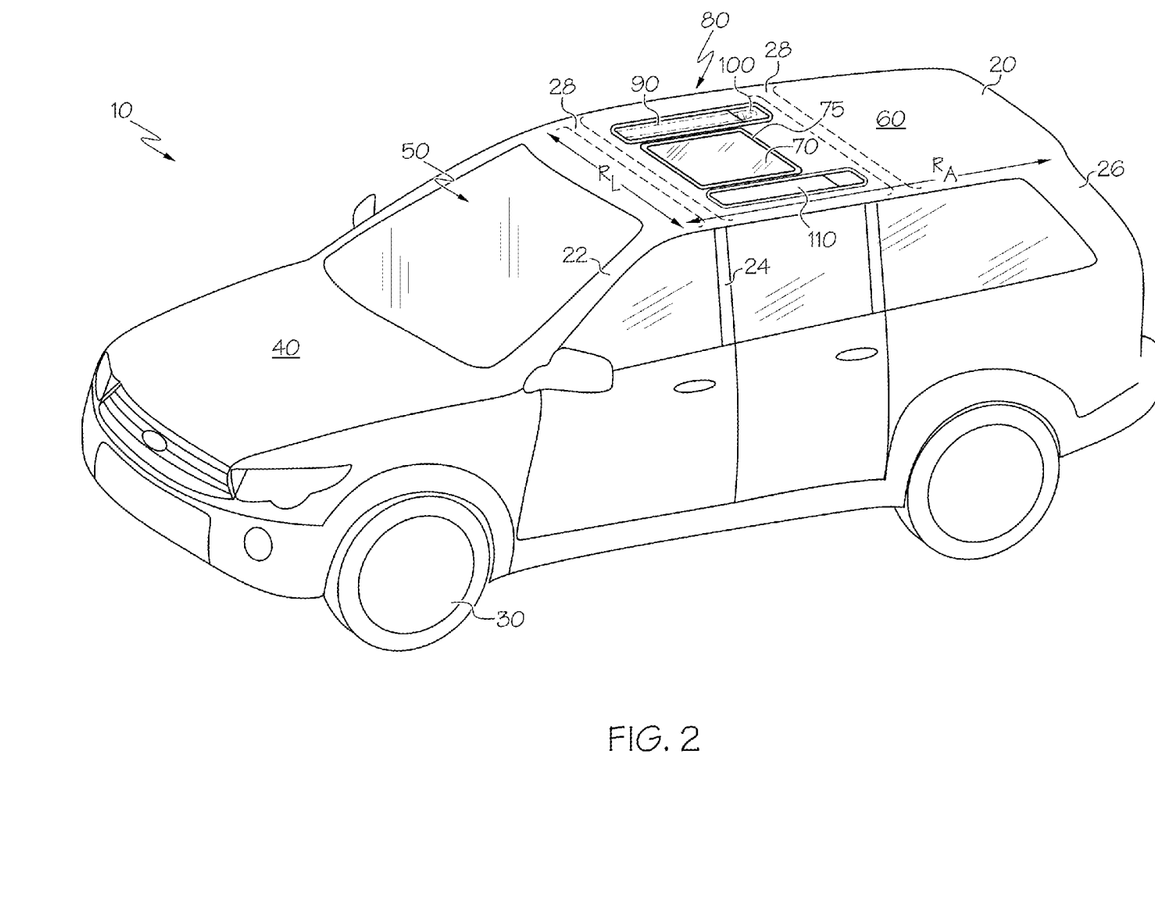
FIG. 2 depicts the vehicle and sensing system of FIG. 1 when the sensing system is in a stowed position.

Referring first to FIGS. 1 and 2, a vehicle 10 includes a chassis 20 with a plurality of wheels 30. Chassis 20 may either be of body-on-frame or unibody construction, and both configurations are deemed to be within the scope of the present disclosure. A motive power unit 40 such as a conventional internal combustion engine (ICE), battery pack, fuel cell stack or a hybrid combination of one or more of the above may be situated in or on the chassis 20 to provide propulsive power to the vehicle 10. As shown, the motive power unit 40 is situated underneath a hood that is placed at the fore end of vehicle 10. A passenger compartment 50 is formed inside the chassis 20 and serves not only as a place to transport passengers and cargo, but also as a place from which a driver may operate vehicle 10. A guidance apparatus (which may include, among other things, steering wheel, transmission, accelerator, brakes or the like) is used in cooperation with the wheels 30, motive power unit 40 and other systems to control movement of the vehicle 10.

A generally planar roof 60 defines a closure surface with contours along lateral and axial rooflines $R_L$ and $R_A$ at the top of vehicle 10. As can be seen, the lateral dimension is substantially transverse to the intended travel direction of vehicle 10, while the axial dimension is substantially collinear with the intended travel direction of vehicle 10. In some embodiments, the roof 60 may include periodic longitudinal ridges or lateral side downward tapering (neither of which are shown) for structural, aerodynamic or aesthetic reasons; none of these features detract from the fact that the roof 60 is mostly planar in both its side-to-side and front-to-back dimensions that correspond to the lateral and axial rooflines $R_L$ and $R_A$. While the closure surface defined by lateral and axial rooflines $R_L$ and $R_A$ is illustrated as being generally planar, it may have one or more non-planar (i.e., curvilinear or arcuate) regions, features or both. Both planar and non-planar variants are within the scope of the present disclosure. In some embodiments of vehicle 10, the roof 60 may include one or more sunroofs 70 formed therein. In such configuration, the sunroof 70, which is preferably made from glass or an optically transparent synthetic resin, defines a substantially planar form that can mimic the shape of the roof 60 around it. In the present context, the term "sunroof" is meant to encompass any selectively deployable structure formed in the roof 60 of vehicle 10 that permits one or both of visual and open-air access between the passenger compartment 50 and the ambient environment.

Figure 4:
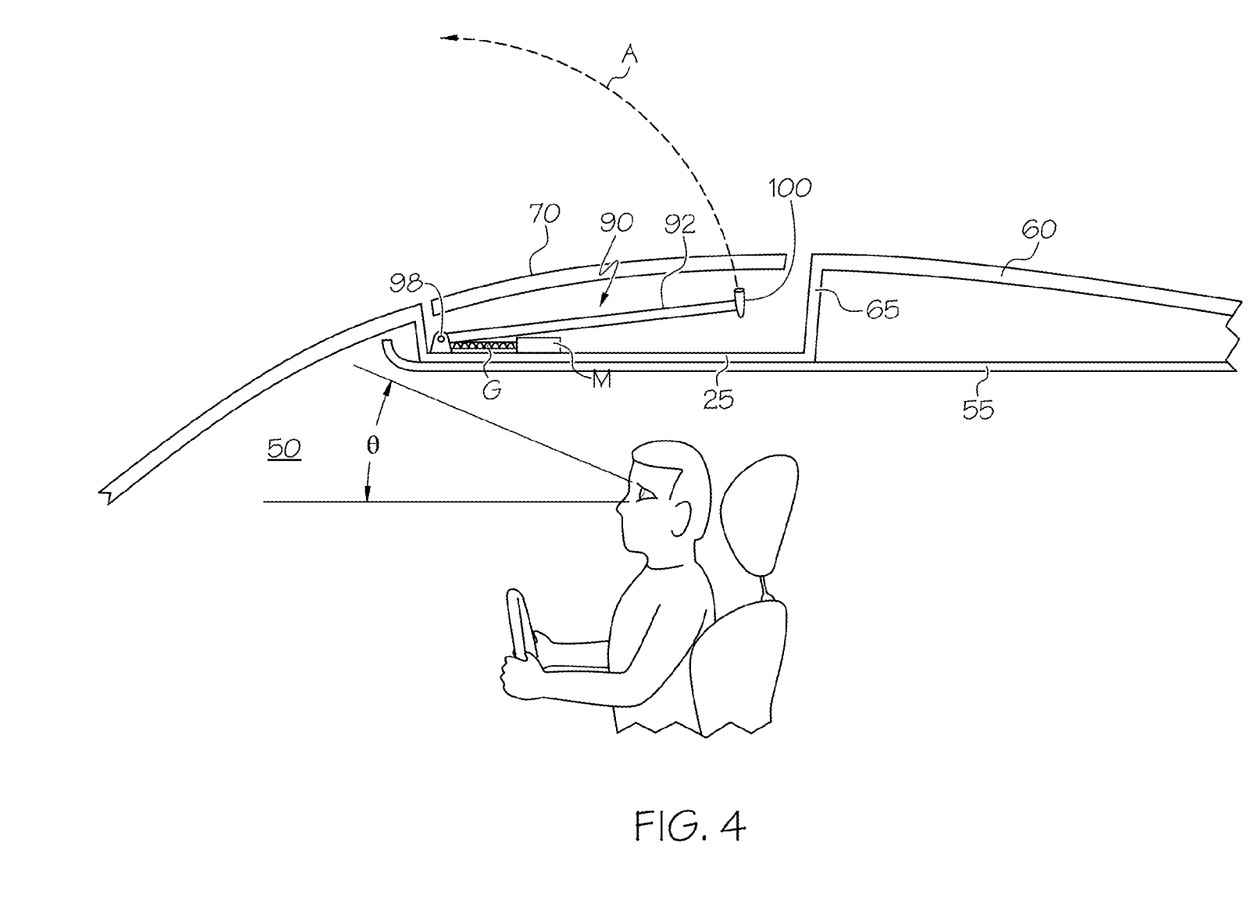
FIG. 4 depicts a side cutaway elevation view of the vehicle and sensing system of FIG. 2.

In some embodiments, the sunroof 70 can be opened and closed either manually or electrically, the latter by the operation of a motor and series of gears, pivots, slots and pins (some of which is shown in conjunction with FIG. 4). In some embodiments, the sunroof 70 moves along a path dictated by longitudinally-extending guide rails (not shown) that are part of a sunroof housing that is formed underneath the roof 60 and integrated within structural elements that may make up a portion of the chassis 20. Examples of such structural elements include A-pillars 22, B-pillars 24, C-pillars 26, crossbar 28 structure, as well as a roof rails, roof bows, or the like (the latter of which are not shown). The sunroof housing and opening/closing structure, as well as the sunroof 70 itself, defines a relatively modest height-wise profile. Moreover, while such profile does require additional roof 60 volume with which to accommodate the structural members, and further while such volume may result in decreases in headroom in the passenger compartment 50 or increases in the overall height of vehicle 10, the guide rails, C-shaped frames, crossbars and related structure used to support sunroof 70 provide a convenient and substantially non-redundant way to secure the sensing system 80 (which is discussed in more detail below).

Preferably, a weather strip is situated on the four peripheral side edges of the sunroof 70 in order to form a hermetic seal 75 when the sunroof 70 is stowed within the opening formed in the roof 60. Likewise, a trough-like recess 65 (which may serve as a rain channel, as well as a location with which to mount the sunroof 70 rails and related supporting structure) may be formed around the periphery of the opening in the roof 60 where the sunroof 70 is placed. Such recess 65 (which may be formed by a stamping operation or the like) permits any accumulated moisture that may have penetrated the weather strip seal to drain to one or more rain troughs (not shown) that are formed in chassis 20.

In one embodiment, the sensing system 80 is made up of at least a retractable mounting structure 90 and one or more sensors 100. The sensing system 80 is integrated into the roof 60 such that it is placed in the same general region as that of the sunroof 70 and its ancillary structure. As shown with particularity in FIG. 1, the sensing system 80 is shown in its deployed mode, where the retractable mounting structure 90 is configured as a kinematic assembly that moves within the recesses 65 that extend along the length of vehicle 10 and are formed in the roof 60 in a manner roughly similar to the trough-like recess that surrounds the sunroof 70. Within the present context, a kinematic assembly is a collection of one or more of trusses, rods, arms, cams, pivots, sliders, rollers, springs, gears or motors that when used in cooperation with one another can affect the selective movement of the sensing system 80 that is discussed herein. In such context, any reference to a linkage as discussed herein embodies at least a subset of some of these components working in conjunction with one another to bring about such selective movement. As illustrated, the recesses 65 may be formed below the closure surface that is defined by the rooflines $R_L$ and $R_A$. In one form, the recess used to accommodate the sunroof 70 housing and related support structure may be made large enough along its lateral dimension to also accommodate the placement of the sensing system 80. Thus, in the configuration shown, the mounting structure 90 that is used to selectively raise and lower the sensors 100 is disposed on opposing lateral boundaries of the sunroof 70 and secured to suitable structure in the chassis 20 generally and roof 60 particularly such that its path of movement between the stowed and deployed positions proceeds along a substantially longitudinal (i.e., front-to-back) axis of the vehicle 10.

In one embodiment, the mounting structure 90 is constructed as a slider-crank variant of a four-bar linkage, where a longitudinal groove 96 acts as a prismatic joint that is formed in the frame 25 (or other adjacent fixed link structure from chassis 20) acts as a slider along which the truss 92 that acts as the driver or crank can rotate and translate. In addition, truss 94 acts as the connecting rod floating link. Pivots 98 function as revolute hinged joints between the truss 92 and the truss 94, between the truss 94 and the slider 96, while the rearward pivot 98 may also be made to slide along the prismatic joint that forms the longitudinal groove 96. In a variation, the truss 92 may define a telescoping structure so that instead of being conveyed along a path defined by the slider 96, the truss 92 its hingedly fixed at its opposing ends so that it expands and contacts along its axial dimension in order to achieve selective raising and lowering of the mounting structure 90 and sensors 100. Instead of trusses, the various portions of the four-bar link that make up the mounting structure 90 may be made from other parallel sets of relatively thin, elongate rods or related structural members that, through a combination of pivoting or sliding, are used to join the one or more sensors 100 and frame 25. It will be appreciated that all of the aforementioned forms of mounting structure 90 construction and operation are within the scope of the present disclosure. Of course, other roof 60 or sunroof 70 structural elements may form a suitably rigid hard point for operation of the mounting structure 90. Furthermore, the mounting structure 90 may include other forms of construction (such as a scissor-truss or the like) in order to promote the selective deployment of the sensors 100 without having an unduly long profile when the sensing system 80 is placed in a stowed position. Significantly, four-bar linkage or similar constructions can utilize relatively thin, substantially flat truss-like members as a way to further ensure that the sensing system 80 is sized and shaped to fit within recesses 65 formed in the roof 60.

The one or more sensors 100 are secured along the mounting structure 90 such that upon having the sensing system 80 lifted up in to the deployed position shown in FIG. 1, the sensors are in an elevated height-wise position relative to vehicle 10, thereby allowing them a less-encumbered view of the road or related terrain from which mapping or navigation data is being acquired. Although shown as being secured to the remote end of the truss 94 from where such structure is pivotably secured to the roof 60 or sunroof housing, it will be appreciated that the sensors 100 may be placed anywhere along the length of the truss 94. Moreover, there may be more than one sensor 100 on truss 94, as well as more than one type (i.e., lidar, radar, optical or the like) of sensor 100, and that all such variants are deemed to be within the scope of the present disclosure. Lidar may offer suitable detection ranges (often up to 200 to 250 meters or more) and increased angular resolution that can be particularly well-suited to automotive applications where horizontal or vertical position identification of objects in the road may be performed with greater precision. Lidar may recognize size differences among identified objects, including those from a comparable distance and relative speed. This in turn can allow algorithms that act on the sensed data to draw more accurate conclusions about the type of object within the field of view of sensor 100, especially when the algorithms or software need to compress the three-dimensional data associated with a vehicle 10 in motion into a two-dimensional image suitable for displaying. In addition, lidar sensors can usually be produced at lower costs than comparable devices that operate in other bands within the electromagnetic spectrum.

Examples of the use of sensor data in the pursuit of mapping and navigational operations include U.S. Pat. No. 8,112,178 entitled ROBOTIC PLATFORM FOR AUTONOMOUS AUTOMOTIVE VEHICLE DEVELOPMENT, U.S. Pat. No. 8,384,776 entitled DETECTION OF TOPOLOGICAL STRUCTURE FROM SENSOR DATA WITH APPLICATION TO AUTONOMOUS DRIVING IN SEMI-STRUCTURED ENVIRONMENTS, U.S. Pat. No. 9,062,977 entitled NAVIGATION OF ON-ROAD VEHICLE BASED ON OBJECT REFERENCE DATA THAT IS UPDATED and U.S. Pat. No. 9,239,580 entitled AUTONOMOUS MOBILE ROBOT, SELF POSITION ESTIMATION METHOD, ENVIRONMENTAL MAP GENERATION METHOD, ENVIRONMENTAL MAP GENERATION APPARATUS, AND DATA STRUCTURE FOR ENVIRONMENTAL MAP, all of which are incorporated herein by reference.

Figure 3:
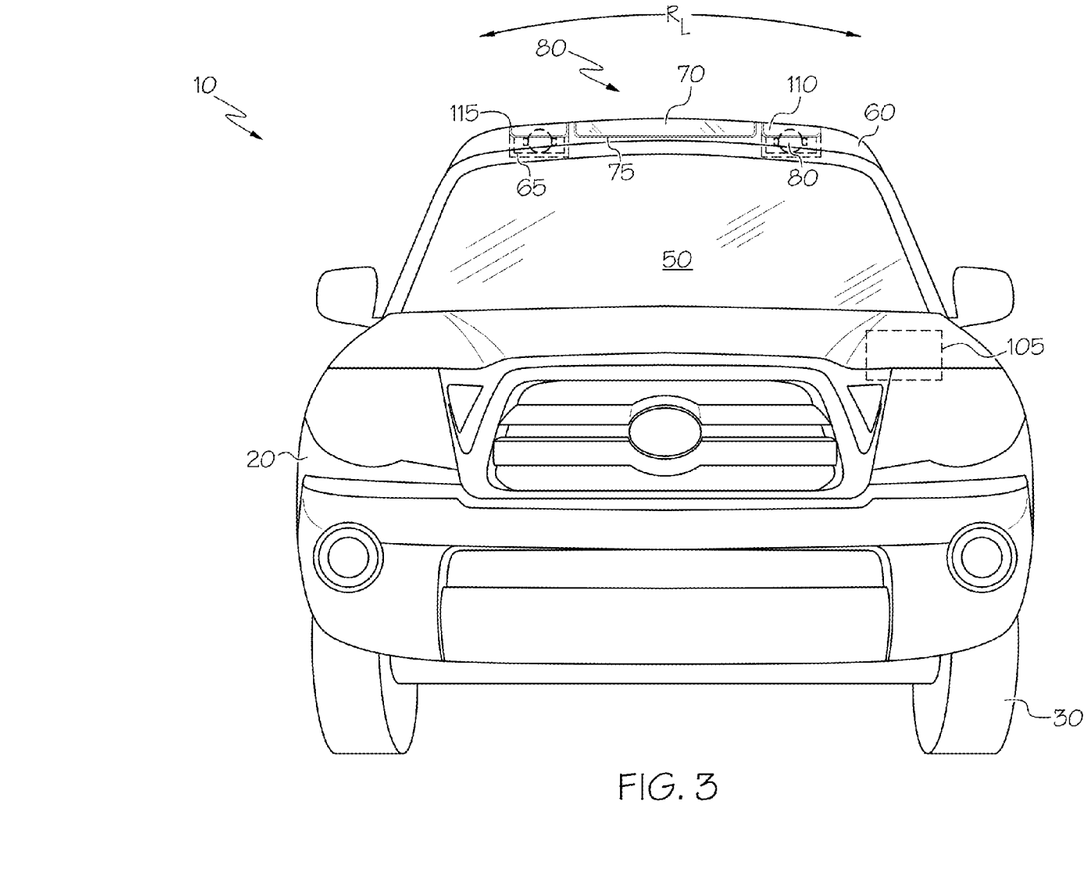
FIG. 3 depicts a front elevation view of the vehicle and sensing system of FIG. 2.

Referring next to FIG. 3, the sensors 100 define a relatively small package such that upon stowing the sensing system 80 in the manner depicted in FIG. 2, the sensors 100 are completely nested underneath rooflines $R_L$ and $R_A$ that define the contour of the closure surface of roof 60. Spring-loading or actuator-based pivoting rotation of each of the sensors 100 or other components may be used to permit the angle of the deployed sensors 100 or other components to be varied about at least horizontal and vertical axes as a way to increase their data acquisition capability. In addition to providing for improved fit, finish, aesthetic and aerodynamic integration of the sensing system 80 into vehicle 10, its stowage into recesses 65 formed in the roof 60 also helps to minimize exposure of the sensitive components to inclement weather, damage, vandalism or the like. The sensors 100 can embody significant miniaturization features, regardless of whether they employ optical, infrared, microwave or other bands within the electromagnetic spectrum. In some embodiments, the sensors 100 are lidar sensors that operate in the infrared band to perform laser imaging, and may include (among other components) an optical beam transmitter, optical detector, beam alignment device, optical filter and spectrometer. Sensors 100 can be signally coupled to a microprocessor-based controller 105 (shown notionally as being within the same compartment that houses the motive power unit 40 but understood to be placeable within any suitable location of vehicle 10) to coordinate data acquisition and storage, as well as overall system 80 operation. In one embodiment, the sensors 100 may be made to emit a series of focused, low-power beams, as well as to detect and record their reflection off of various objects. By capturing and evaluating lidar data over time, the data acquired by the sensors 100—which operates in conjunction with the controller 105—may be built up into a representation of objects and their relative positions to the vehicle 10. This in turn may be used to generate vehicular mapping and navigational data. As will be appreciated, sensors 100 may include mixed modes of data acquisition. Thus, while some of sensors 100 may be laser-based lidars operating in the infrared band, others may be cameras operating in the optical band. In such a system, the images acquired from each different type of sensor 100 may be compared with one another through algorithms operating on the controller 105 so that a more complete map or related rendering of the road being traversed may be ascertained. All such variants are deemed to be within the scope of the present disclosure. Controller 105 may be a digital computer that in addition to having a processing unit, also has an input, an output, and memory that can temporarily or permanently store such a code, program or algorithm in the computer's memory such that the instructions contained in the code are operated upon by the processing unit based on input data. In this way, output data generated by the code and the processing unit can be conveyed to another component (such as sensing system 80), program or a user via output. In one form, a data-containing portion of the memory (also called working memory) is referred to as random access memory (RAM), while an instruction-containing portion of the memory (also called permanent memory is referred to as read only memory (ROM)). A data bus or related set of wires and associated circuitry forms a suitable data communication path that can interconnect the input, output, CPU and memory, as well as sensing system 80 or any peripheral equipment in such a way as to permit the system to operate as an integrated whole. In this way, controller 105 may be configured as a computer system based on a von Neumann architecture so that it may perform one or more specific automated steps outlined in this disclosure. As such, controller 105 becomes a particularly-adapted computer or computer-related data processing device that employs the salient features of such an architecture in order to perform at least some of the data acquisition, manipulation, actuation, control or related computational functions. It will be appreciated by those skilled in the art that computer-executable instructions that embody operations discussed elsewhere in this disclosure can be placed within an appropriate location (such as the aforementioned memory) within controller 105 in order to achieve the objectives set forth in the present disclosure.

Data acquired from the sensors 100 is routed through a bus or other suitable signal communication line to the controller 105. Algorithms (such as those associated with a particular application program) are stored in the controller 105 memory and acted upon by the processors. In addition to the sensors 100, the sensing system 80 may use an inertial measurement unit (IMU), global navigation satellite system (GNSS) or the like to collect information specific to the environment surrounding vehicle 10; such addition information may include that associated with other objects in or around the vehicle's travel path, such as other vehicles, buildings, landmarks, pedestrians, animals or obstacles. Likewise, measurements may be taken by the sensing system 80 to check for elevation changes in the road and other data needed to perform its mapping or navigation functions. In an autonomous mode of operation, the controller 105 is used to navigate the vehicle 10 over a road or other suitable surface based on information acquired by the sensing system 80. In such mode, the controller 105 at least partially provides operating instructions to the motive power unit 40 and the guidance apparatus.

As mentioned above, in configurations where vehicle 10 is equipped with a sunroof 70, the retractable nature of the mounting structure 90 and attached sensors 100 is such that they may be secured to the housing or other supporting structure that surrounds the sunroof 70, thereby taking at least partial advantage of rigid mounting points within the roof 60. In this way, the sensing system 80 places only incremental additional demands on the volumetric region between the roof 60 and passenger compartment 50. When the vehicle 10 is in a data acquisition mode, the mounting structure 90 can be deployed (such as through the operation of a motor M and gear train G, both as shown in FIG. 4, as well as with springs or other biasing members to have the sensors 100 pop up out of the roof 60 as shown in FIG. 1. While in their deployed position, the one or more sensors 100 are extended away from the roof 60 to define a data-acquisition mode of operation in order to achieve their mapping or navigational functions, and when the system 80 is in its stowed position within a recess formed in the roof 60, both the sensor 100 and mounting structure 90 define a substantially flush profile across the portion of the roof 60 defined by the recess 65. Within the present context, a substantially flush profile is formed by the sensing system 80 when in its stowed position across the corresponding part of the roof 60 when the roof 60—in being viewed from a front or side elevation of the vehicle 10—appears to have no significant discontinuities, gaps, protuberances or other undulations relative to the generally continuous profile of the rooflines $R_L$ and $R_A$. In such context, seams (including those seams that are filled by seals 75) that are visible between the adjacent roof 60 and a fairing 110 surfaces are not violative of such substantially flush profile so long as they result in a gap no wider than necessary to perform their sealing function. By way of a non-limiting example, if the adjacent surface of roof 60 were completely planar, the surface of the fairing 110 would likewise be planar, in addition to being coplanar with the adjacent roof 60 surface. Thus, any seam formed at the point of adjacent abutment between such joined surfaces would be deemed to be within the present meaning of a substantially flush profile so long as it does not result in a gap that is wider than it need be in the course of commonly-accepted vehicular fit and finish. In a similar way, contours within the abutting surfaces with the roof 60 and fairing 110 are deemed to form a substantially flush profile so long as such contour defined by the surface of one is not appreciably different from that of the other. By way of a non-limiting example, if the adjacent surface of roof 60 were completely planar, the surface of the fairing 110 would likewise be planar, in addition to being coplanar with the adjacent roof 60 surface. Likewise, if the adjacent surface of roof 60 defined a generally arcuate contour, the surface of the fairing 110 would likewise be arcuate with a radius of curvature compatible with the overall contour of the roof 60. Regardless of the precise contours of the roof 60, the construction of the sensing system 80 is such that when stowed, the view across or along the roof 60 defines an aesthetically-pleasing and aerodynamically unobtrusive profile.

Referring back to FIGS. 1 and 2 in conjunction with FIG. 3, this flush profile is enhanced by the presence of fairings 110 which are used predominantly when the sensing system 80 is in the stowed position of FIG. 2. In particular, the fairings 110 define a relatively thin and generally planar rectangular member that upon retraction of the sensing system 80 into the recess 65, provides a smooth, continuous outer surface closure. In some embodiments, the fairings 110 may be made of a similar material to that of the roof 60, and can be painted to match colors. While indicated as being generally planar, a slightly convex shape may also be employed in order to help preserve the lateral contour of the outer roofline $R_L$. Likewise, the fairings 110 may be rigid enough to withstand loads (whether in the form of weight placed on them as part of the roof 60 when stowed, or in the form of wind when sensing system 80 is deployed). Additionally, seals 115 may be disposed around the periphery that is defined by the fairings to further promote a substantially water-tight, aesthetically-pleasing roof profile during such times as when the assembly of the sensing system 80 is in the stowed position. These seals 115 perform similar hermetic functions to those of the seals 75 that are formed around sunroof 70. Taken in conjunction with one another, the use of the fairings 110 and the small size of the mounting structure 90 and sensors 100 give the sensing system 80 a relatively unobtrusive volumetric profile that is stowed between the roof 60 and passenger compartment 50 during periods where the sensors 100 are not in operation so that the outer dimension of the roof 60 and its related aesthetic attributes are not altered. Although not shown, the fairings 110 may include ether hinges, apertures or portions that are transparent to the particular wavelength of interest so that the sensor 100 can perform its emitting and detecting functions during deployment while still preserving a substantially closed, sealed closure of the sensing system 80 during stowage.

In some embodiments, the fairings 110 may be secured directly to the roof 60 in order to perform their covering function. In such configurations, hinges or related pivots similar to pivots 98 may be formed between the roof 60 and fairings 110 such that upon deployment of the sensing system 80, the fairings 110 rotate away from the roof 60 at the hinge point. Such movement may be achieved through any suitable actuation system, including motor-and-gear driven, hydraulic or pneumatic variants, and coupled to controller 105 such that their opening and closing may be made to correspond with the respective deploying and stowing movements of the sensing system 80.

In some embodiments, the fairing 110 may be formed as an integral part of the truss 92 rather than being merely attached to it. In such construction, the fairing 110 can be sized and shaped to provide both adequate levels of structural integrity to the mounting structure 90, as well as the requisite degree of coverage of the recess 65 in order to ensure the substantially continuous, flush profile between the adjacent surfaces of the sensing system 80 and roof 60.

Referring next to FIG. 4, a side cutaway elevation view of the vehicle 10 and sensing system 80 of FIG. 2 when the sensing system 80 is in a stowed position shows that the depth of the sensing system 80 is not so great as to cause any further encroachment of the roof 60 into the passenger compartment 50. The cooperation of the frame 25, recess 65, sunroof 70 (shown presently in simplified form without connected actuators, frames, housings, rails or other support structure for clarity) and mounting structure 90 allows the sensors 100 to define an unobtrusive stowed profile that takes advantage of existing volumetric assets between the roof 60 and headliner 55 of passenger compartment 50. In some embodiments, the sensors 100 define a small volumetric profile of no more than about 2 to 3 inches in each of the height, width and thickness dimensions. This miniaturization of the actual sensing capability can provide the sensing system 80 with a small profile (and the small associated weight) so that the rods, trusses or related bar-like members of the mounting structure 90 can be kept thin while still having sufficient rigidity to perform their deployment functions. Certain portions of data-collecting during modes of operation of the sensing system 80 may be performed while the vehicle 10 is moving. For example, as the vehicle 10 traverses a highway or other road, the sensor 100 may collect large amounts of data (often in excess of 700,000 data points per second). The reduction in size of the mounting structure 90 may not conflict with the data-acquisition operation of the sensors 100. As such, relative movement of the various components relative to one another may be avoided to provide accuracy of the data acquisition and associated mapping operation.

Furthermore, such small outer dimensions can reduce the volumetric impact in the region between the roof 60 and headliner 55. As with the sunroof 70, the region in or around the sunroof 70 defines an unobtrusive profile that is contoured (e.g., substantially planar) with the roof of the vehicle. Importantly, the synergistic effect of having small size sensors 100 and mounting structure 90 helps to provide that the sensing system 80 fits within the recess 65 that is formed in the roof 60; particularly in the height-wise dimension, so that the sensors 100 and mounting structure 90 do not encroach either downward into the passenger compartment 50 or upward to extend the overall height of the roof 60. This preservation of the substantial continuity and original profile of the roof 60 is shown with particularity in FIG. 3, where the roofline R is shown without any significant deviations in its generally planar surface.

The look up angle θ for the driver may be maintained from being compromised, as well as to not have a headliner 55 lowered to accommodate the sunroof 70 and its ancillary structure. The sensing system 80 may also fit in such a way that it does not alter the operation of the chassis 20 in general and the frame 25 in particular, including crossbar structure, roof rails, roof bows or related rigid reinforcement structure. One particular area of interest is in the upper corner of the roof 60 that is near the A, B or C-pillars 22, 24 or 26, where the reinforcements share the flange with the windshields. Although not shown, the frame 25 that is formed in the region around the sunroof 70 within the roof 60 also includes pass-through features for wire harnesses to power motor M, as well as a suitable secure mounting location for seals 115 used to prevent water entry when the sensing system 80 is in the stowed position. In a manner generally similar to that of the sunroof 70 that was discussed in conjunction with FIG. 1, the selective raising and lowering of the sensing system 80 may be actuated by a motor M and one or more gears G that are stowed in the recess between the roof 60 and the headliner 55 of the passenger compartment 50. In one preferred form, the gears G may be in the form of a worm gear that is rotatably coupled to an output shaft formed on motor M. It will be appreciated that although the vehicle 10 depicted in FIGS. 1 through 4 is outfitted with a sunroof 70 that the sensing system 80 of the present disclosure is equally applicable to vehicle configurations where no such sunroof is present.

Figure 5:
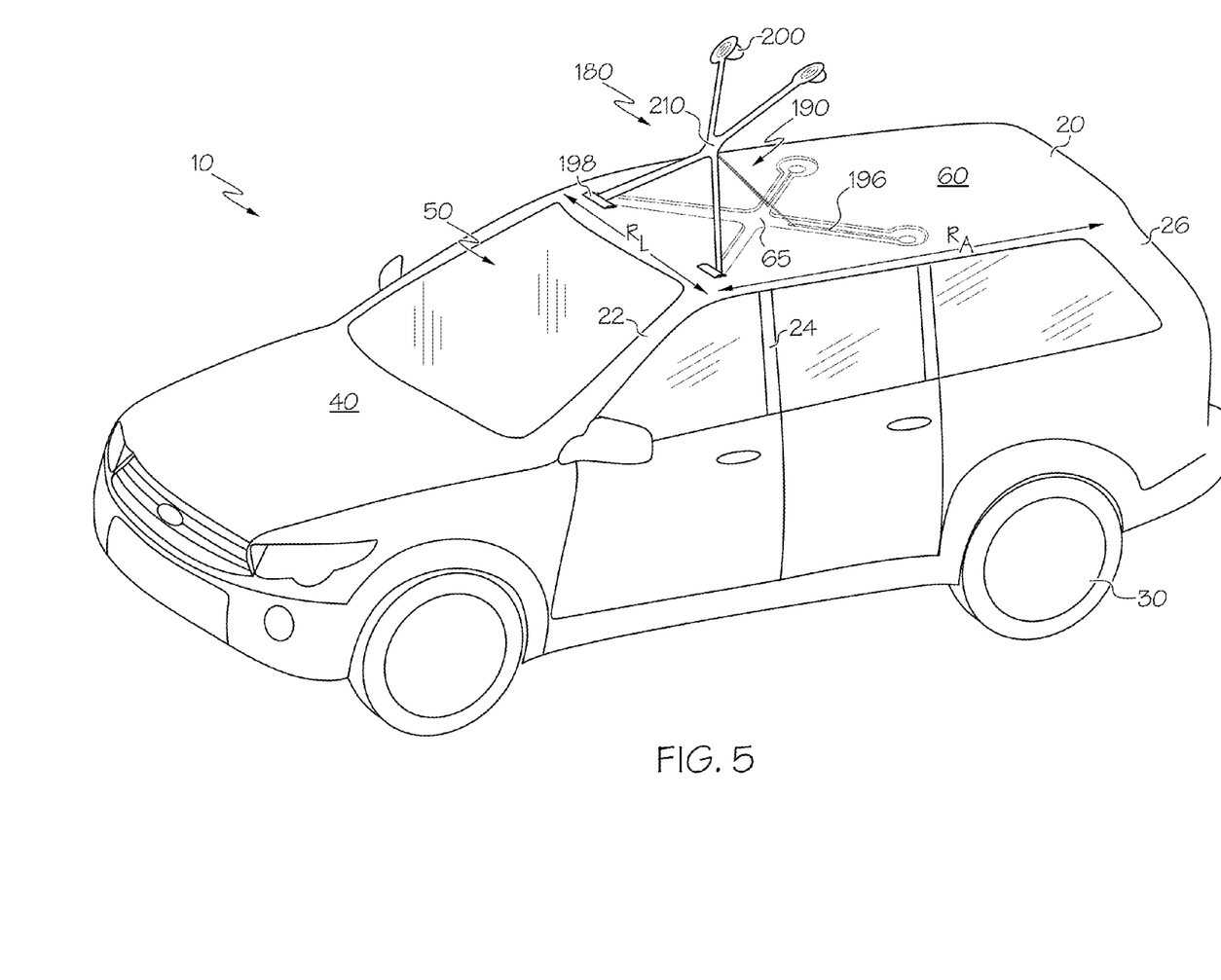
FIG. 5 depicts a perspective view of a vehicle with a sensing system in a deployed position according to another embodiment as described herein.
Figure 6:
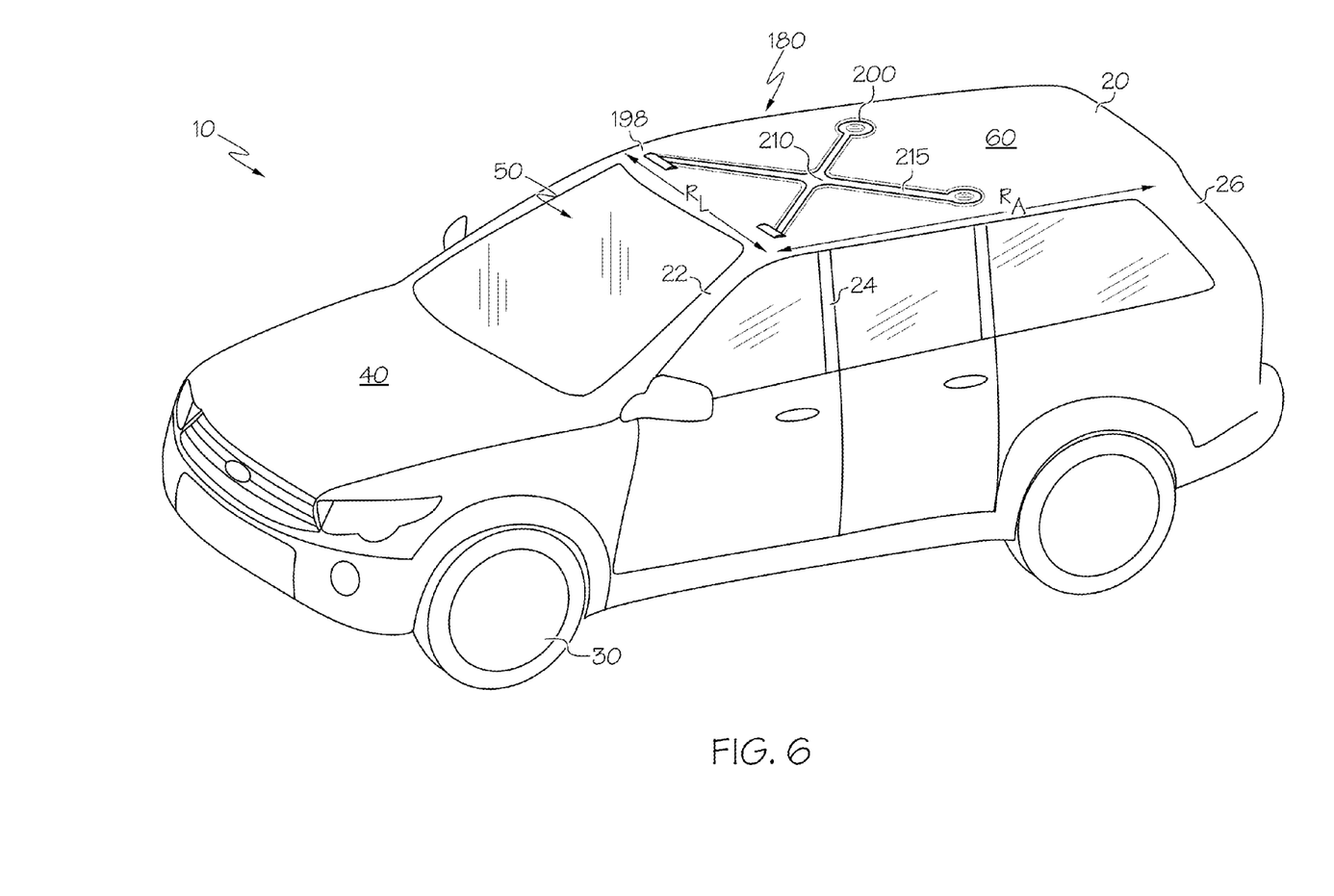
FIG. 6 depicts the vehicle and sensing system of FIG. 1 when the sensing system is in a stowed position.

Referring next to FIGS. 5 and 6, another embodiment shows a sensing system 180 with mounting structure 190 and sensors 200. Instead of the pair of laterally-spaced, similarly-constructed mounting structure truss assemblies of FIGS. 1 through 3 are used, a single X-shaped mounting structure 190 is shown. As with that other embodiment, mounting structure 190 is coupled to the roof 60 through a deployable linkage that employs one or both of sliding and pivoting connectors 196, 198, as well as an actuator (such as a motor and gears as discussed above) to raise and lower sensing system 180. The recess 165 formed in the roof 60 now defines a corresponding X-shape rather than the relatively rectangular profiles of the other embodiment.

Because the X-shaped profile of mounting system 190 has a more robust lateral deflection resistance than its parallel truss counterpart in mounting system 90, it may be made from even thinner members. The increased rigidity inherent in the X-shaped configuration versus the separate parallel trusses may be further exploited in configurations where fairing 210 forms a one-piece structure that is affixed to the lifting and lowering truss or rod members.

Although the embodiment depicted in FIGS. 5 and 6 does not include a sunroof, it will be appreciated that the X-shaped configuration of the mounting structure 190 may also be employed in a vehicle 10 where a sunroof (such as sunroof 70 of FIGS. 1 through 3) is included. In such configuration, rather than straddling the periphery of the sunroof, the sensing system 180 would be placed farther back along the vehicle 10 centerline such that is sits aft of the sunroof.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicular sensing system comprising:
   at least one sensor configured to acquire at least one of vehicular mapping and navigational data;
   a retractable mounting structure secured to a roof of a vehicle and coupled to the at least one sensor to permit selective movement between a stowed position and a deployed position such that when the retractable mounting structure is in the deployed position, the at least one sensor is extended away from the roof to operate in a data-acquisition mode of operation, and when the system is in its stowed position, both the at least one sensor and the mounting structure are at least partially situated within a recess formed in the roof; and
   a fairing cooperative with at least one of the mounting structure and the at least one sensor such that when the system is in the stowed position, the fairing covers at least a portion of the recess, the at least one sensor and the mounting structure.

2. The sensing system of claim 1, wherein the at least one sensor comprises at least one lidar sensor.

3. The sensing system of claim 1, wherein the mounting structure comprises a linkage that is pivotably coupled to the roof through at least one hinge.

4. The sensing system of claim 3, wherein the linkage moves in response to the operation of at least one motor and at least one gear.

5. The sensing system of claim 3, wherein the linkage comprises a four-bar linkage.

6. The sensing system of claim 1, wherein the fairing covers the substantial entirety of each of the mounting structure and at least one sensor when the system is in the stowed position.

7. The sensing system of claim 6, further comprising a seal disposed about a peripheral edge of the fairing.

8. A vehicle comprising:
   a wheeled chassis defining a passenger compartment therein with a roof disposed thereover;
   a motive power unit;
   a guidance apparatus cooperative with the wheeled chassis and motive power unit; and
   a vehicular sensing system comprising:
     at least one sensor configured to acquire at least one of vehicular mapping and navigational data;
     a retractable mounting structure secured to the roof and coupled to the at least one sensor to permit selective movement between a stowed position and a deployed position such that when the retractable mounting structure is in the deployed position, the at least one sensor is extended away from the roof to operate in a data-acquisition mode of operation, and when the system is in its stowed position, both the at least one sensor and the mounting structure are at least partially situated within a recess formed in the roof; and
     a fairing cooperative with at least one of the mounting structure and the at least one sensor such that when the system is in the stowed position, the fairing covers at least a portion of the recess, the at least one sensor and the mounting structure.

9. The vehicle of claim 8, wherein the at least one sensor comprises at least one lidar sensor.

10. The vehicle of claim 8, wherein the mounting structure comprises a linkage that is pivotably cooperative with the roof through at least one hinge, the linkage is responsive to the operation of at least one motor and at least one gear situated within the roof.

11. The vehicle of claim 10, wherein the linkage comprises a slidable coupling.

12. The vehicle of claim 8, wherein the fairing is coupled to the roof with a hinge.

13. The vehicle of claim 8, wherein the fairing is affixed to at least one of the mounting structure and the at least one sensor.

14. The vehicle of claim 8, further comprising a seal disposed between the fairing and the recess.

15. The vehicle of claim 10, further comprising a sunroof defined within a portion of the roof such that the mounting structure is disposed on opposing lateral boundaries of the sunroof to define a path of movement between the stowed and deployed positions that proceeds along a substantially longitudinal axis of the vehicle.

16. The vehicle of claim 8, wherein the sensing system defines a substantially flush profile across the portion of the roof that corresponds to the placement of the sensing system within the recess during the stowed position.

17. A method for performing at least one of vehicular mapping and vehicular navigation, the method comprising:
   securing a sensing system to a recess formed in a vehicular roof, the sensing system comprising:
     at least one sensor selected from the group consisting of camera, lidar and radar;
     a retractable mounting structure coupled to the at least one sensor; and
     a fairing cooperative with at least one of the mounting structure and the at least one sensor such that when the system is in the stowed position, the fairing covers at least a portion of the recess, the at least one sensor and the mounting structure;
   moving the system between the stowed position and the deployed position such that when the system is in its stowed position within the recess, the fairing covers at least a portion of each of the recess, the at least one sensor and the mounting structure; and
   acquiring at least one of mapping data and navigational data through the at least one sensor when the system is in the deployed position.

18. The method of claim 17, wherein the mounting structure is disposed on opposing lateral boundaries of the sunroof to define a path of movement between the stowed and deployed positions that proceeds along a substantially longitudinal axis of the vehicle.

19. The method of claim 16, further comprising operating the vehicle at least partially in response to the at least one of the acquired mapping data and navigational data.

20. The method of claim 16, wherein the sensing system defines a substantially flush profile across the portion of the roof defined by the recess when the sensing system is in the deployed position.

* * * * *